United States Patent [19]
Jambhekar et al.

[11] Patent Number: 5,848,356
[45] Date of Patent: Dec. 8, 1998

[54] METHOD FOR IMPLEMENTING ICONS IN A RADIO COMMUNICATION DEVICE

[75] Inventors: Shrirang N. Jambhekar, Schaumburg; Gregor E. Bleimann, Evanston; S. Num Pisutha-Arnond, Wheeling, all of Ill.

[73] Assignee: Motorola, Inc., Schaumburg, Ill.

[21] Appl. No.: 537,559

[22] Filed: Oct. 2, 1995

[51] Int. Cl.⁶ .............................. H04Q 7/20; H04M 3/00; H04M 1/00

[52] U.S. Cl. ..................... 455/403; 455/564; 455/418; 379/216; 379/355; 379/93.23

[58] Field of Search .................... 455/403, 414, 455/416, 564, 566, 565, 418, 419; 379/354, 355, 201, 202, 216, 93.23, 52, 356, 93.17, 93.19, 100.14

[56] References Cited

U.S. PATENT DOCUMENTS

| | | | |
|---|---|---|---|
| 4,653,086 | 3/1987 | Laube | 379/96 |
| 4,785,420 | 11/1988 | Little | 379/52 |
| 5,175,759 | 12/1992 | Metroka et al. | 379/58 |
| 5,202,828 | 4/1993 | Vertelney et al. | 364/419 |
| 5,283,862 | 2/1994 | Lund | 395/155 |
| 5,414,457 | 5/1995 | Kadowaki et al. | 379/355 |
| 5,533,110 | 7/1996 | Pinard et al. | 379/201 |
| 5,561,705 | 10/1996 | Allard et al. | 455/464 |
| 5,625,676 | 4/1997 | Greco et al. | 379/93.23 |

FOREIGN PATENT DOCUMENTS

| | | |
|---|---|---|
| 227327A2 | 7/1987 | European Pat. Off. . |
| 398711A2 | 11/1990 | European Pat. Off. . |
| 95/24707 | 9/1995 | WIPO . |

OTHER PUBLICATIONS

"Electronics Newsfront", William J. Hawkins with David Scott; Popular Science, pp. 38–39, Feb. 1990.
"What Does A New PC Have Over All Other PC's? It's Also A Telephone And A Fax–With A Touch–Sensitive Screen."; Canon, Personal Computing, p. 29, May 1990.
"Let Your Agent Do the Walking", Mitch Ratcliffe; PC World, pp. 56, 58, Feb. 1994.
Simon™ *Mobile Communications Made Simple*, BellSouth Cellular Corp., 1994.
Marco® Wireless Communicator, *User's Guide*, Motorola, p. 20.
Envoy® Wireless Communicator, *User's Guide*, Motorola, pp. 64, and 67–72.

*Primary Examiner*—Dwayne D. Bost
*Assistant Examiner*—Tracy M. Legree
*Attorney, Agent, or Firm*—John J. King

[57] ABSTRACT

The unique method for implementing icons in a radio communication device (103) which provides a plurality of radio communication services such as radiotelephone, facsimile and electronic mail services enables a more efficient user interface. The radio communication device preferably comprises a touch screen display (119) for displaying functional icons stored with directory numbers to simplify the location of information and the transmission of messages. In particular, functional icons associated with one of the plurality of communications services can enable easier searching of directories or transmission of messages when stored in connection with directory numbers.

9 Claims, 19 Drawing Sheets

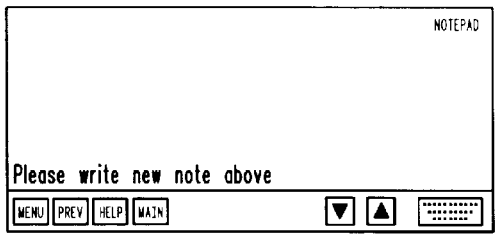
*FIG. 11A*
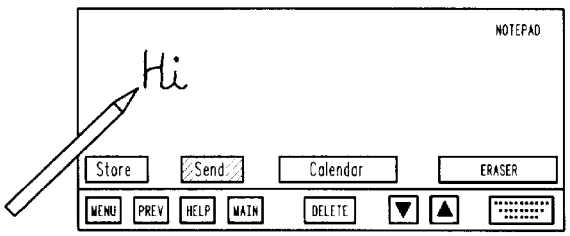
*FIG. 11B*
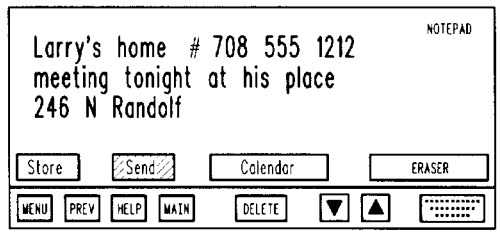
*FIG. 11C*
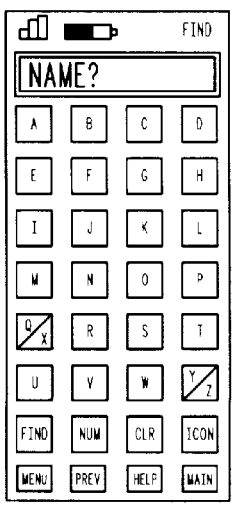 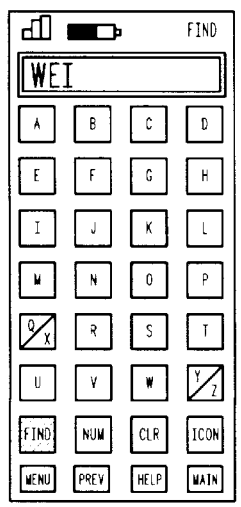 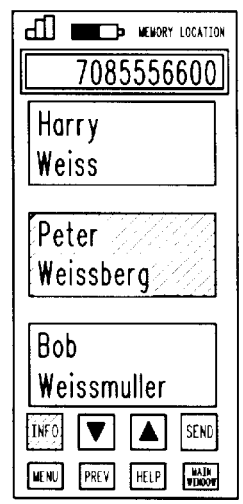 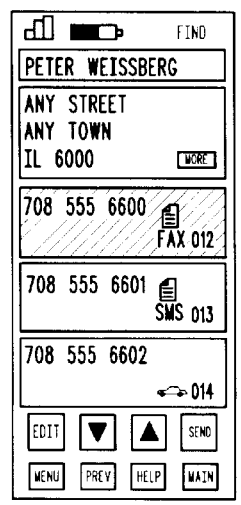
*FIG. 11D*     *FIG. 11E*     *FIG. 11F*     *FIG. 11G*

METHOD FOR IMPLEMENTING ICONS IN A RADIO COMMUNICATION DEVICE

FIELD OF THE INVENTION

Generally, the present invention relates to radio communication devices, and more particularly to radio communication devices having functional icons associated with stored directory number.

BACKGROUND OF THE INVENTION

Today, radio communication devices provide radio communication services such as two-way radio service, radiotelephone service, cellular phone service, cordless phone service and wireless data communication services such as wireless facsimile (fax), electronic mail (e-mail), and short message service. These services are generally packaged individually into single radio communication devices, such as a traditional radiotelephone. When packaged as individual devices, these radio communication devices are relatively easy to use.

However, there is increasing pressure in the marketplace to provide multi-functional radio communication devices that offer more than one of the typical radio communication services mentioned above. Attempting to combine such radio communication services into a single radio communication device creates a cumbersome and undesirable user interface that is undesired by potential customers. A typical user interface includes a speaker, a microphone, a display and a data input device such as a keypad. For some radio communication services, a small display and a small data input area is required. For example, in a portable radiotelephone often there is a small display and a fixed data input keypad. On the other hand, a wireless data service such as e-mail requires extensive display of received messages as well as extensive user data input from either a pen or a keyboard.

In an integrated radio communication device that combines a radiotelephone and an e-mail or facsimile service, the simpler user interface of the radiotelephone service would not satisfy the requirements of a complex user interface required for the services. In particular, multiple numbers may be stored with a particular entry in a phone directory. For example, an individual or business may have one or more numbers associated with a telephone, a fax machine, e-mail or short messaging service (SMS). Thus, it would be advantageous to provide an integrated data communication device having icons associated with certain directory numbers for more convenient operation by the user.

DETAILED DESCRIPTION OF A PREFERRED EMBODIMENTS

An embodiment of the present invention preferably encompasses a radio communication device having a touch screen display disposed in the body housing element for displaying functional icons associated with particular communication services such as telephone, e-mail, fax, short messaging service or other service. The radio communication device may also encompass a moveable housing element coupled to the main body for moving between an open or extended position and a closed position. When the moveable housing element is in the closed position, the moveable housing element covers at least a portion of the touch screen display.

Additionally, the radio communication device preferably has a keypad disposed in the moveable housing element. The keys have a first portion exposed through corresponding apertures in the moveable housing element, such that when a user depresses the first portion of the keys, a second portion of the key provides pressure against the touch screen display for activating a first set of user functions. The provided pressure activates a portion of the touch screen display. When the moveable housing element is in the open or extended position, the radio communication device has a second set of user functions including functional icons associated with radiotelephone functions, advanced radiotelephone functions, and messaging functions such as electronic mail, faxing, and short message service. The functional icons displayed on the screen can be accessed touching the screen with a stylus or writing implement.

Figure 1:
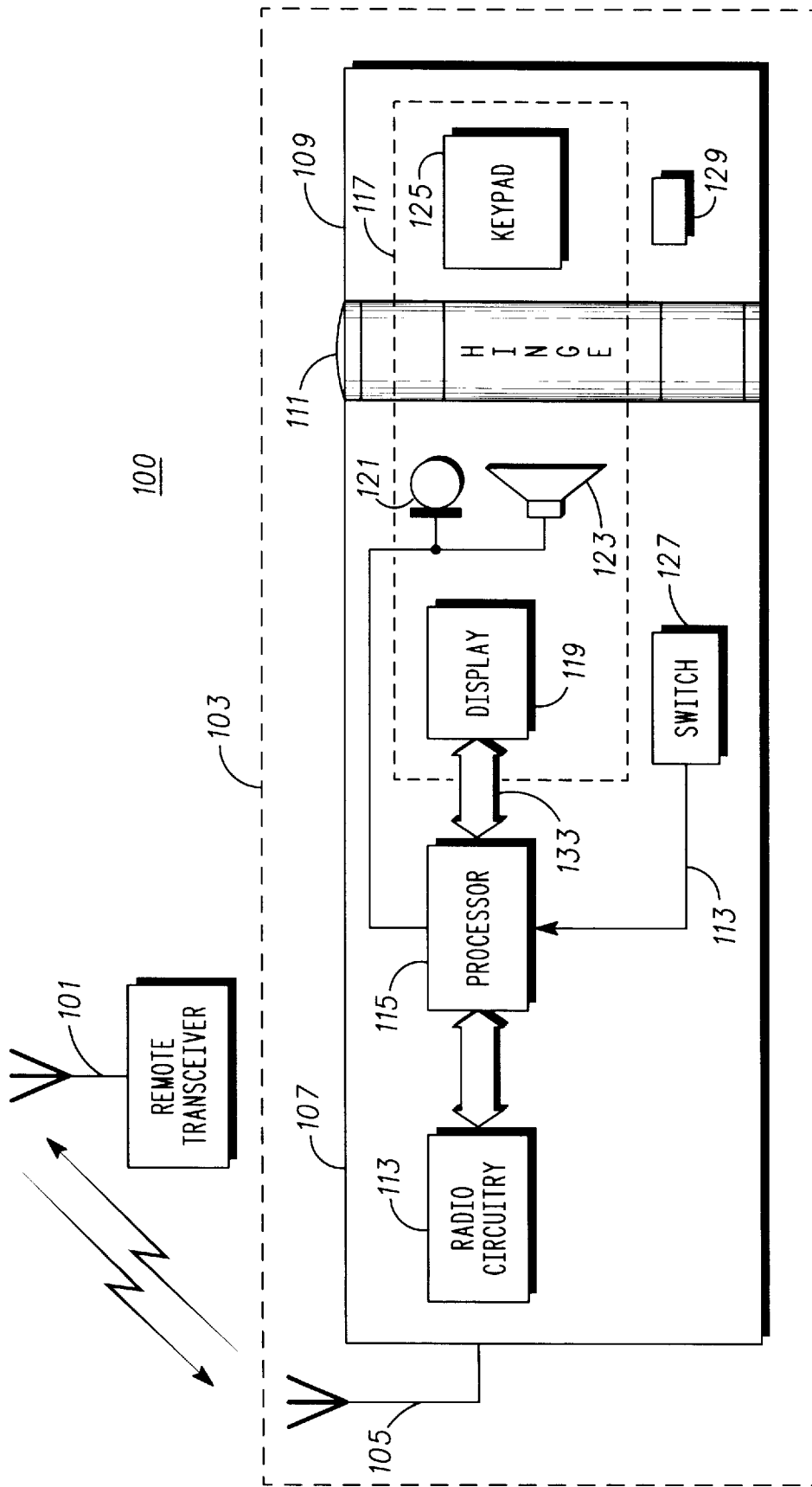
FIG. 1 is a block diagram of a radio communication system in accordance with the present invention.

FIG. 1 is a block diagram of a radio communication system 100. The radio communication system 100 includes a remote transceiver 101 for sending and receiving radio frequency (RF) signals to and from multiple radio communication devices within a fixed geographic area. The radio communication device 103 is one such radio communication device contained within the geographic area served by the remote transceiver 101. The RF signals transmitted between the remote transceiver 101 and the radio communication device 103 provide radio communication services such as radiotelephone service, electronic mail service, wireless fax service and short message service. Other embodiments of the present invention may include other combinations of these communication services and other radio communication services.

The radio communication device 103 includes an antenna 105, a body housing element 107, a moveable housing element 109, and a hinge 111 for coupling the moveable housing element 109 to the body housing element 107. In the preferred embodiment, the body housing element 107 includes radio circuitry 113, a processor 115, and a portion of a user interface 117. The user interface 117 includes a display 119, a microphone 121, a speaker 123, and a keypad 125. The display 119, the microphone 121, and the speaker 123 are disposed within the body housing element 107. The keypad 125 is disposed within the moveable housing element 109 in the preferred embodiment. Additionally, the radio communication device 103 includes a switch 127 disposed within the body housing element 107 and a switch activation device 129 disposed within the moveable housing element 109. It is anticipated that other equally sufficient embodiments of the present invention would include a radio communication device that equally disposed components between a body housing element and a moveable housing. Such an embodiment would dispose at least a portion of the radio circuitry within the body housing element.

The radio communication device 103 receives the RF signals through the antenna 105 and converts the received RF signals into electrical RF signals for use by the radio circuitry 113. The radio circuitry 113 demodulates the electrical RF signals and recovers the data transmitted using the RF signals. Additionally, the radio circuitry 113 outputs the data to the processor 115. The processor 115 includes at least a main microprocessor such as an MC68040 available from Motorola, Inc., and associated memory as well as other control circuits including integrated circuits or other known technologies. The processor also includes programs for implementing the method steps of the present invention set forth in FIGS. 4–11 in response to inputs from the touch screen or other inputs. The processor 115 formats the data output from the radio circuitry 113 into a recognizable voice or messaging information for use by the user interface 117. The user interface 117 communicates the received information or voice to a user through the use of the speaker 123 and the display 119.

Upon transmission of RF signals from the radio communication device 103 to the remote transceiver 101, the user interface 117 transmits user input data to the processor 115. Such data may include voice data and/or messaging information. The processor 115 formats the information obtained from the user interface 117 and transmits the formatted information to the radio circuitry 113. The radio circuitry 113 converts the formatted information into electrical RF modulated signals to the antenna 105 for transmission back to the remote transceiver 101.

Figure 2:
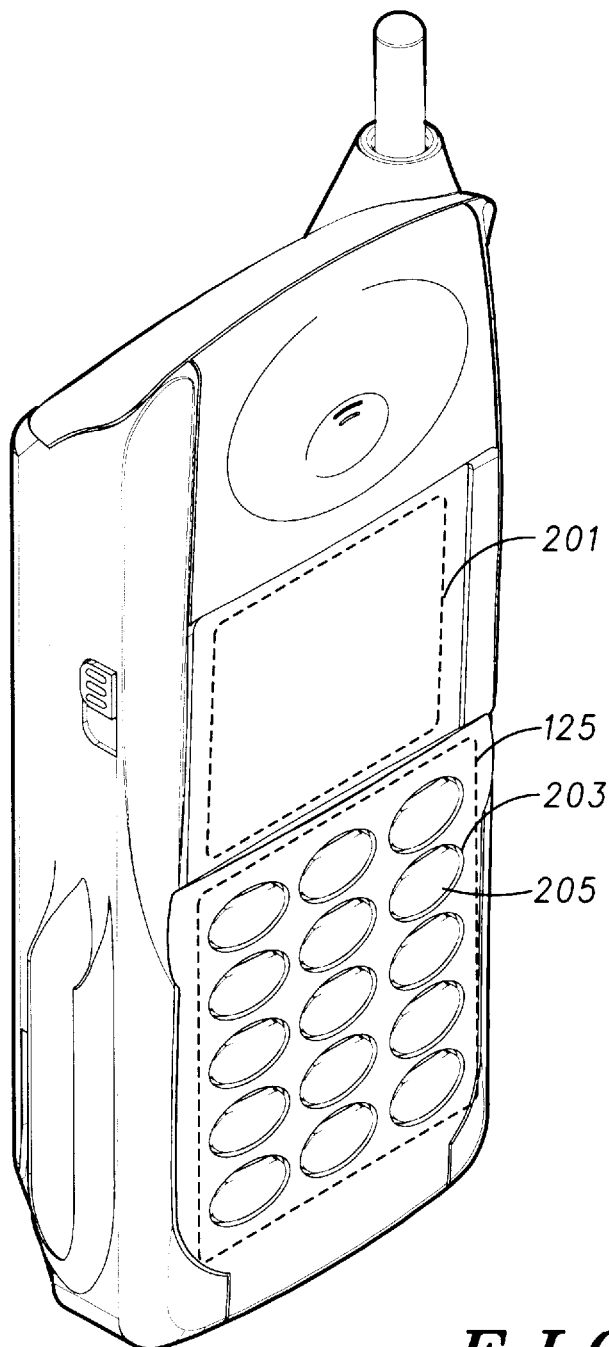
FIG. 2 is a detailed illustration of a radio communication device in a closed position in accordance with the present invention.

In the preferred embodiment, the moveable housing element 109 has a first position and second position, also referred to as an open position and a closed position. FIG. 2 is a detailed illustration of the radio communication device 103 of FIG. 1 in the closed position. When the moveable housing element 109 is in the closed position, it covers a portion of the touch screen display 119 and the radio communication device 103 has a limited first set of user functions available. The limited set of user functions include only radiotelephone functions such as inputting telephone numbers, initiating and ending telephone calls and recalling phone numbers from a memory. This limited set of user functions is related to the functions available on a low tier radiotelephone available today. In the closed position a portion of the touch screen display 119 is exposed to the user. This exposed portion contains a data display area 201 for displaying radiotelephone feedback such as a telephone number, a signal strength, a battery level, and roaming information.

In the preferred embodiment, the moveable housing element 109 includes a keypad 125. The keypad 125 includes a plurality of individual keys including a limited number of function keys and a number pad containing individual keys numbered 0–9. Each individual key is disposed within the moveable housing element 109. Each key has a first portion of the key exposed on a first side of the moveable housing element 109 and a second portion of the key is exposed on a second side of the moveable housing element 109. The keys are arranged such that when the moveable housing element 109 is in the closed position, the plurality of keys are arranged adjacent to a user data area (not shown) of the touch screen display 119. The user data area of the touch screen display 119 is covered by the moveable housing element 109 and is divided up into multiple user data sub-areas which correspond to the plurality of keys of the keypad 125. When the first portion of a first key is depressed by a user, the second portion of the first key provides a pressure against the touch screen display and activates a corresponding user data sub-area. This activation of the particular user data sub-area of the touch screen display 119 creates a corresponding signal that is sent back to the processor 115 to interpret the meaning of the activation. This signal is sent via the display bus 133.

Figure 3:
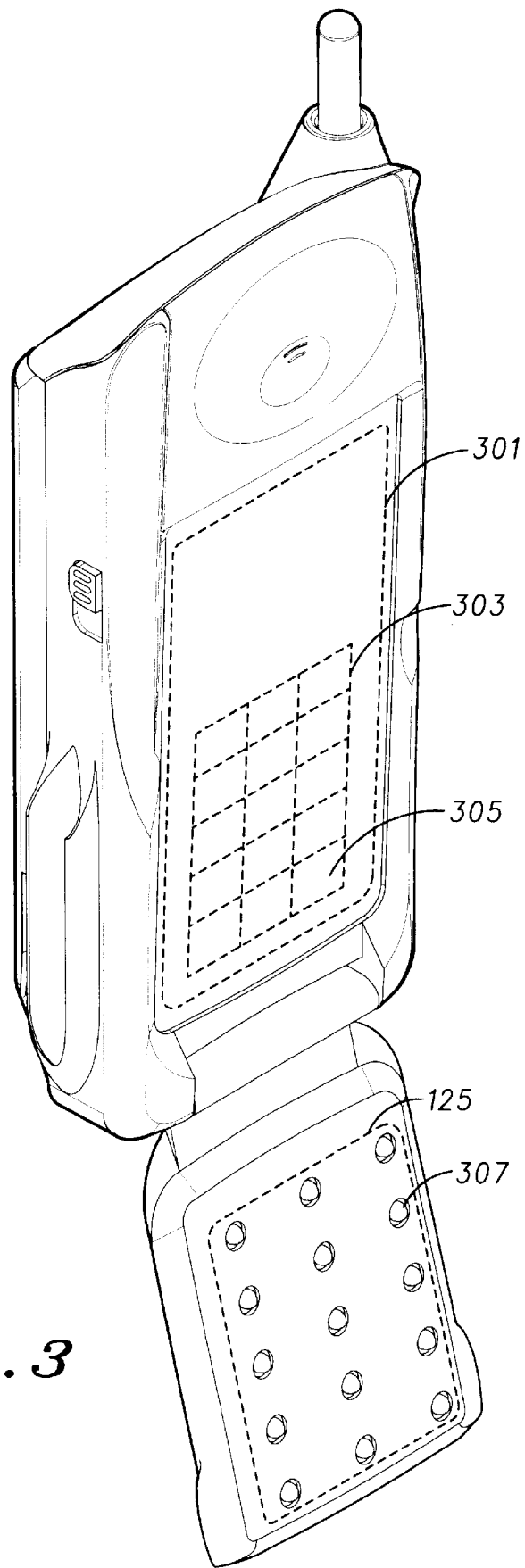
FIG. 3 is a detailed illustration of a radio communication device in an open position in accordance with the present invention.

FIG. 3 is a detailed illustration of the radio communication device 103 of FIG. 1 in the opened position. Information displayed in the data display area may be oriented vertically in a portrait mode, or horizontally in a landscape mode. As the moveable housing element 109 is moved to the open or extended position the switch activation device 129 in conjunction with the switch 127 creates a mode change signal 131 that is sent to the processor 115, as illustrated in FIG. 1. The mode change signal 131 indicates to the processor 115 that the moveable housing element 109 is being opened and a second set of user functions becomes available to the user. In the preferred embodiment, the second set of user functions includes advanced radiotelephone control functions and messaging functions such as wireless faxing, electronic mail and short messaging service.

With the moveable housing element 109 in the open or extended position, the radio communication device 103 has a second set of user functions. This second set of user functions includes advanced radiotelephone control functions and messaging functions. The advanced radiotelephone functions include a menu for storing and recalling telephone numbers as well as programming the user's preferences for controlling the radiotelephone. All of the radiotelephone control functions, including the advanced and the limited radiotelephone control functions, are displayed in a radiotelephone display configuration. This configuration includes orienting the display in the portrait mode. All of the messaging functions including electronic mail, faxing and short message service are displayed in a messaging display configuration. This configuration includes orienting the display in the horizontal direction. Additionally, when the moveable housing element 109 is in the opened position, the display arrangement for the touch screen display 119 is reconfigured. This reconfiguration includes increasing the data display area 301 to include the entire touch screen display 119 and it also changes the number of user data sub-areas 305 in the user data area 303. In the preferred embodiment the data display area 301 and the user data area 303 overlap each other when the moveable housing element 109 is in the extended or opened position.

Additionally, the radio communication device 103 performs additional functions responsive to the moveable housing element 109. Specifically, as the moveable housing element 109 moves from the closed position to the opened position, the radio communication device 103 can perform an off-hook function. As the moveable housing element 109 moves from the opened position to the closed position, the radio communication device 103 can perform an on-hook function. Furthermore, any other predetermined radio communication device control function can be performed in response to moving the moveable housing element between the first position and the second position.

Alternatively, the first set of user functions may include exclusively radiotelephone control functions and the second set of user functions may include exclusively messaging functions. In this alternative embodiment, when the moveable housing element 109 is in the closed position, the radio communication device 103 functions only as a radiotelephone. When the moveable housing element 109 is in the open or extended position, the radio communication device 103 operates solely as a messaging communication system. Consequently, the touch screen display would be oriented in the portrait mode while the moveable element is closed and in response to moving the moveable housing element 109 to the open position, the touch screen display 119 would be reconfigured to the landscape mode.

In the detailed illustration of the portable radio communication device 103 in FIG. 2 and FIG. 3, the moveable housing element 109 is a keypad cover. It is anticipated that other equally sufficient embodiments of a moveable housing element 109 may be substituted therefor. These other embodiments include: a clam shell type housing element, a swivel type housing element and a sliding type housing element.

Figure 4:
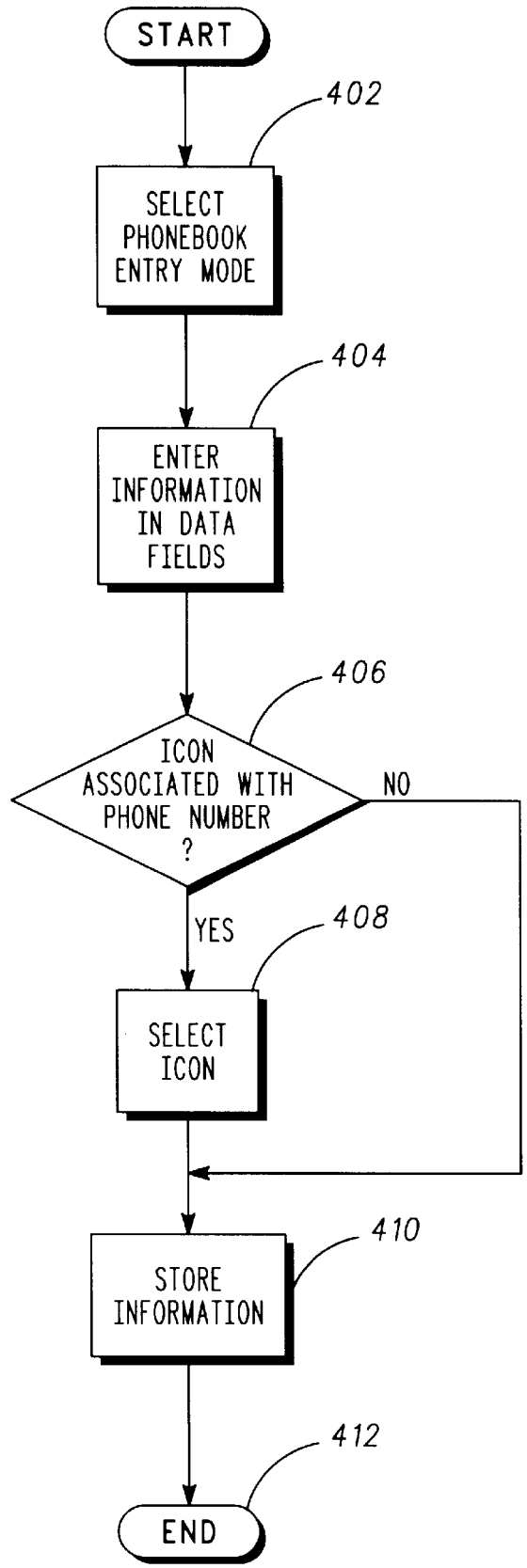
FIG. 4 is a flow chart showing the steps for storing directory numbers and associated icons in the radio communication device according to the present invention.
Figure 4A:
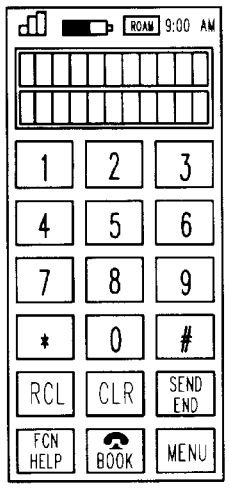
Figure 4B:
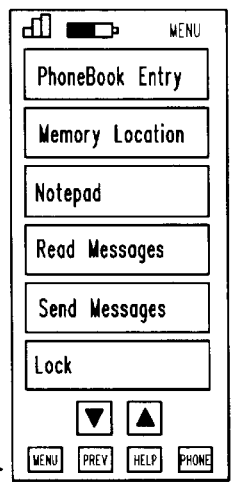
Figure 4C:
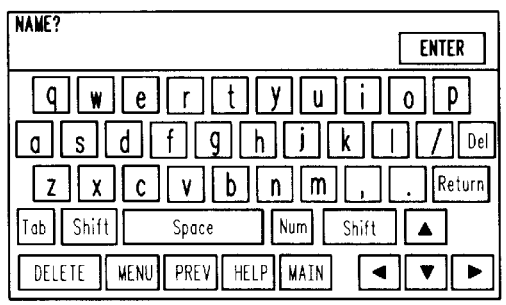
Figure 4D:
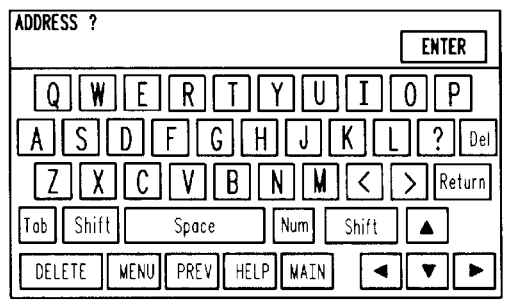
Figure 4E:
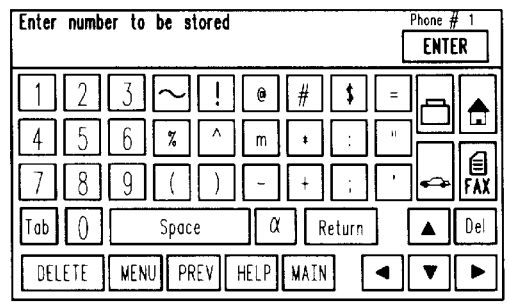
Figure 4F:
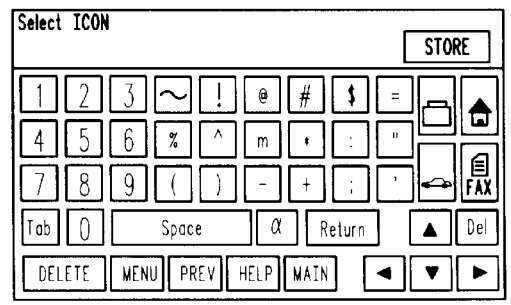

Turning now to FIG. 4, the operation of storing directory numbers and associated icons in a phone book directory of the radio communication device is shown. For ease of understanding, exemplary images associated with a given step which could be displayed on the screen will be shown as necessary. After entering the main menu (MENU) (FIG. 4-1), the phone book entry mode is selected (FIG. 4-2) at a step 402. Various information fields can then be entered at a step 404. Among other information, the name (commonly called alpha tag), title, company, address and various directory numbers including phone or fax and other addresses including e-mail and SMS addresses may be entered. When the phone book entry mode is selected, a prompt for entering a name with a QWERTY keyboard arrangement is preferably shown in the touch screen display to enter the name (FIG. 4-3). While the QWERTY keyboard is shown in the display, handwriting recognition software such as Quick-Print™ available from Lexicus Corporation could be used to enter the name or other information according to the present invention. After the name is entered, an address prompt is shown in the display (FIG. 4-4).

Figure 5:
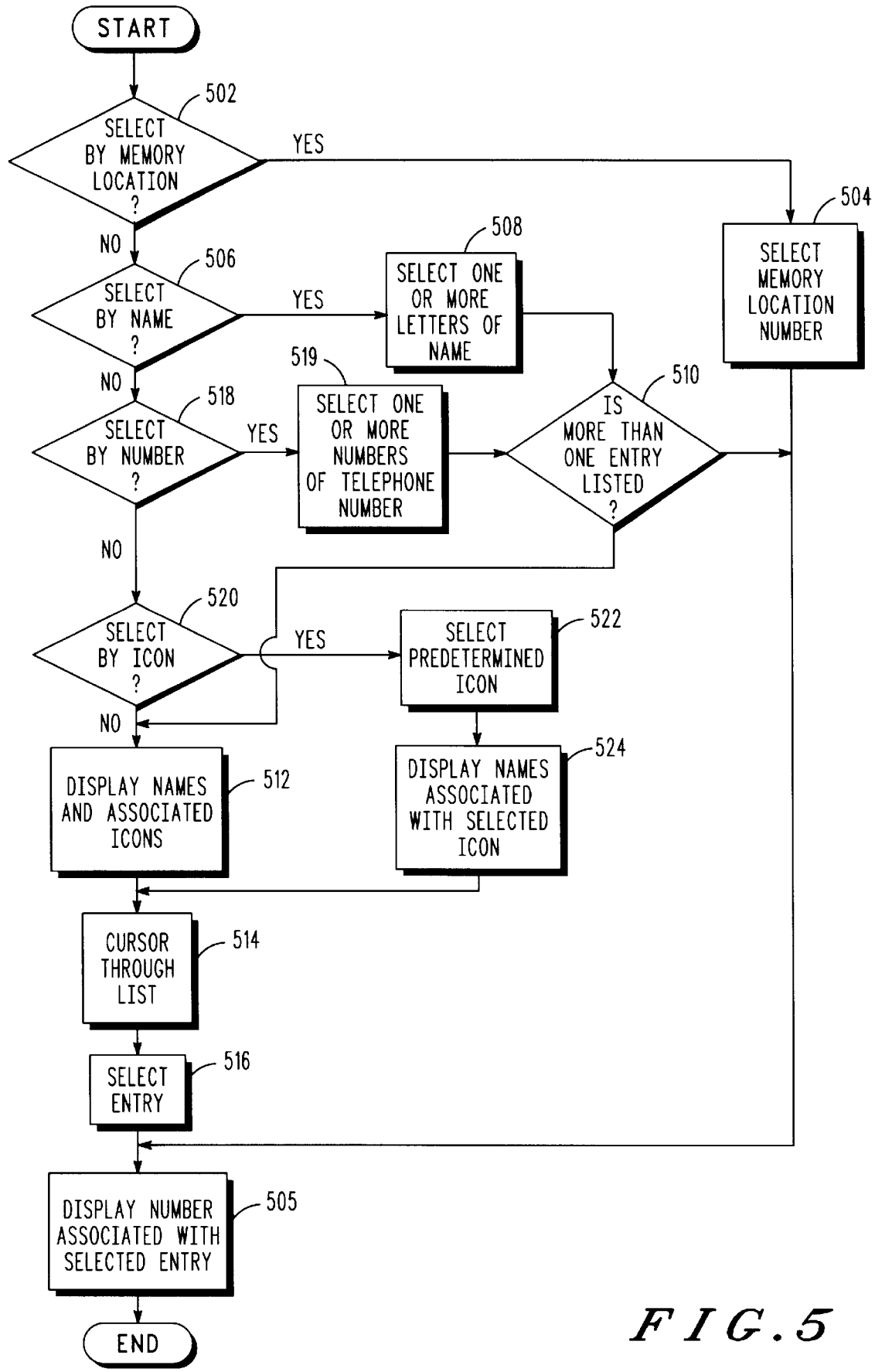
FIG. 5 is a flow chart showing the steps for selecting a directory number associated with particular entry.
Figure 5A:
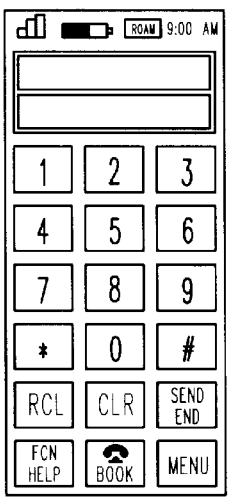
Figure 5B:
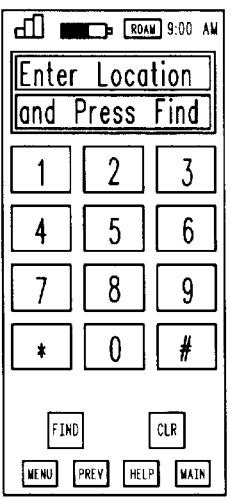
Figure 5C:
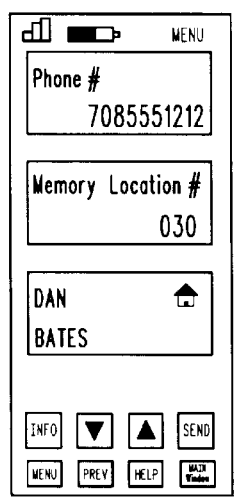
Figure 5D:
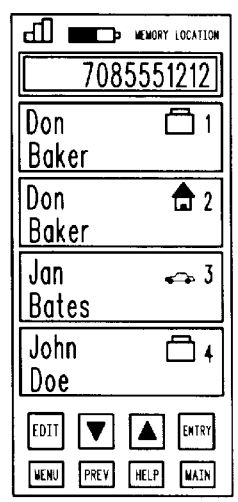
Figure 5E:
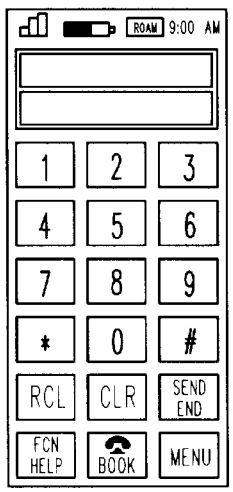
Figure 5F:
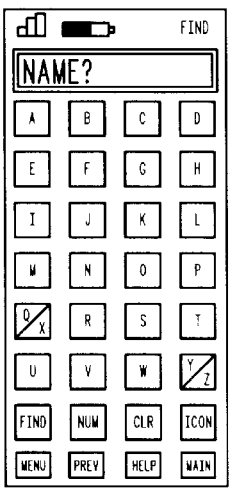
Figure 5G:
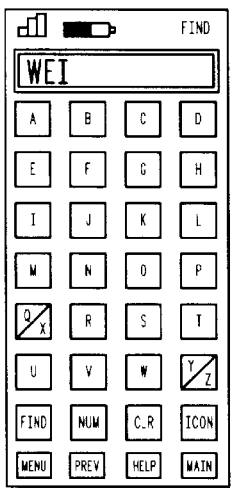
Figure 5H:
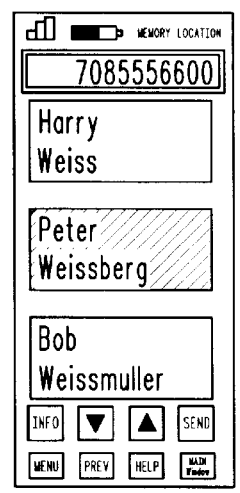
Figure 5I:
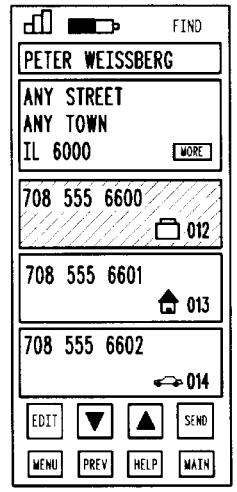
Figure 5J:
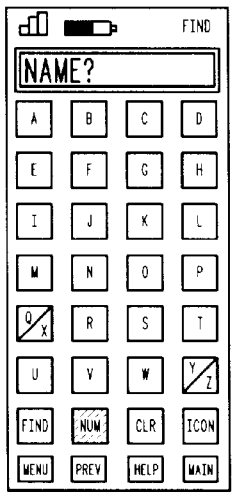
Figure 5K:
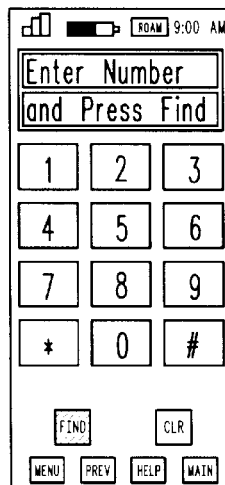
Figure 5L:
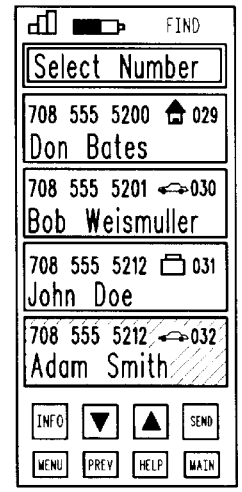
Figure 5Q:
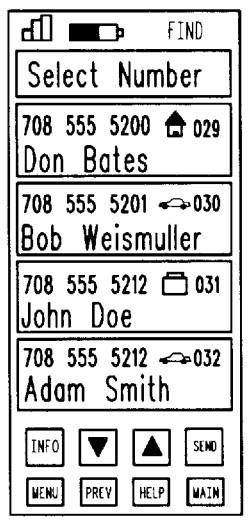
Figure 5Q:
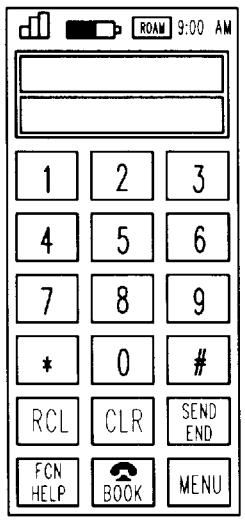
Figure 5Q:
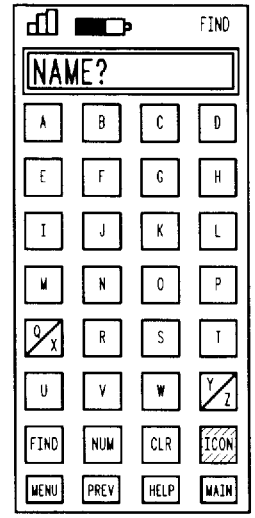
Figure 5Q:
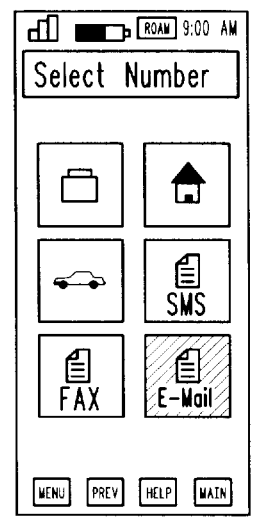
Figure 5Q:
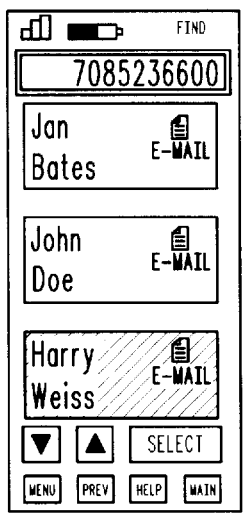

After all name/address information has been entered, a message prompts the user to enter a number (FIG. 4-5). While the number could represent any directory number or messaging service address, the user is then presented with an option to select an icon associated with the number or address at a step 406. Preferably, the user is prompted to select an icon associated with that number to associate the number with a functional feature of the phone. As shown for example in FIG. 4-6 icons representative of work, car, home and a fax machine could be associated with entered numbers. However, any number of other icons could employed according to the present invention. After entering the number and selecting an icon if desired at a step 408, the information is stored in the memory of the radio communication device at a step 410 and the entry is completed. Alternatively, designated fields could be established having icons associated with particular fields, wherein the user would enter a number in a particular field associated with an icon.

Turning now to FIG. 5, the operation of selecting an entry of the phone book directory is shown. A user has the option of entering the phone book directory by selecting the phone book icon on the display, or selecting a recall (RCL) option on the display to directly enter a memory location of the phone directory (FIG. 5-1). If the user selects the recall option at a step 502, the user then selects the numerical location associated with the entry 25 (FIG. 5-2) by entering the memory location number and selecting the FIND key at a step 504, and the name and phone number associated with that memory location is displayed (FIG. 5-3) at a step 505. Additional information associated with that entry could also be displayed as desired. Alternatively, the predetermined memory location may be displayed with name and icon associated with the predetermined memory location being shown, and with sequentially adjacent memory locations also being shown (FIG. 5-4). This option would enable the user to cursor through sequentially adjacent entries if desired.

Figure 6:
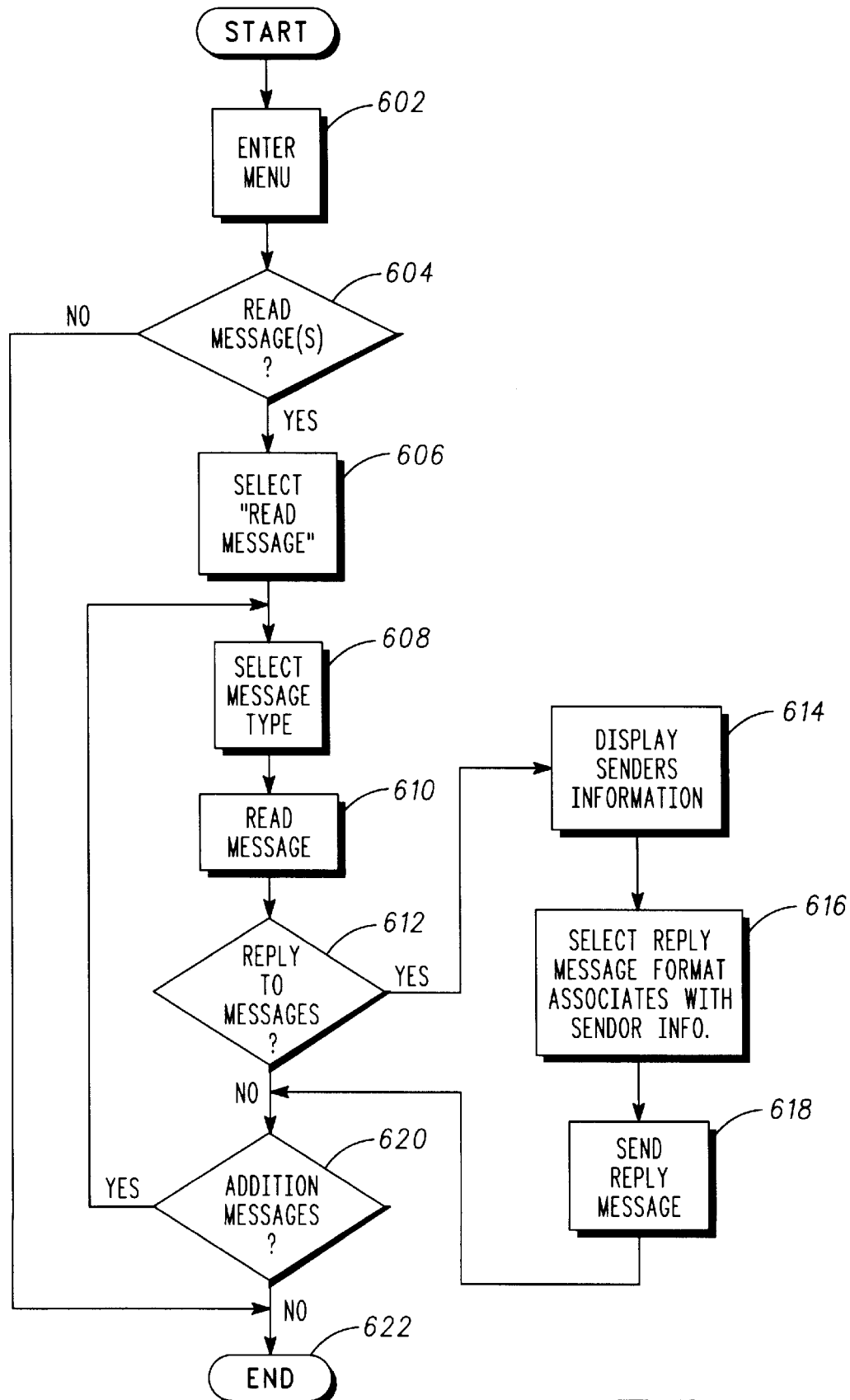
FIG. 6 is a flow chart showing the steps for reading/replying to messages according to the present invention.
Figure 6A:
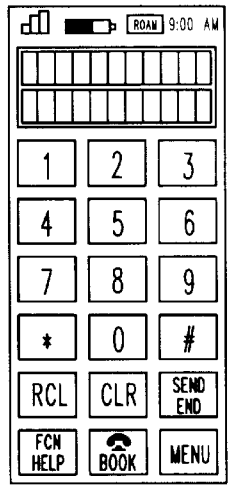
Figure 6B:
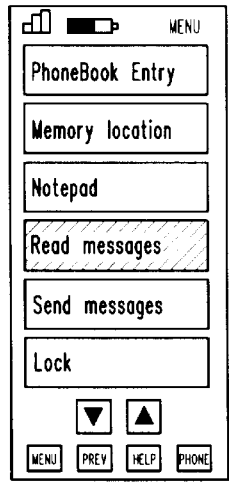
Figure 6C:
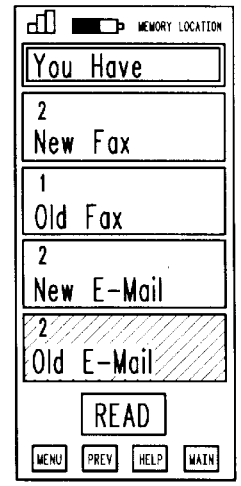
Figure 6D:
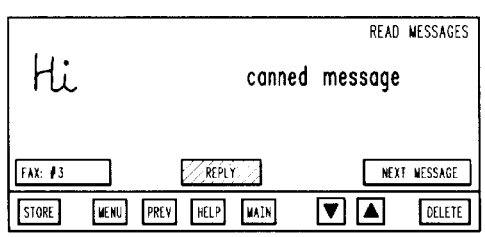
Figure 6E:
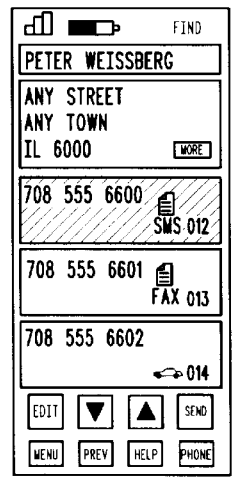
Figure 6F:
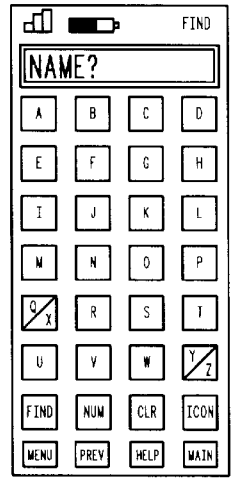
Figure 6G:
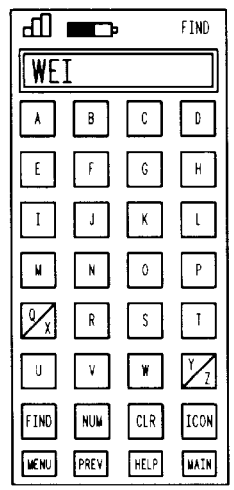
Figure 6H:
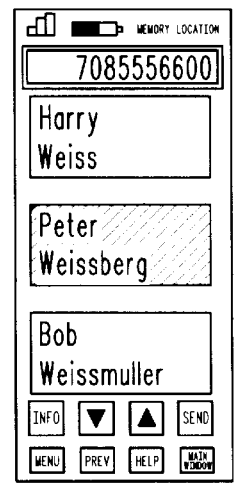
Figure 6I:
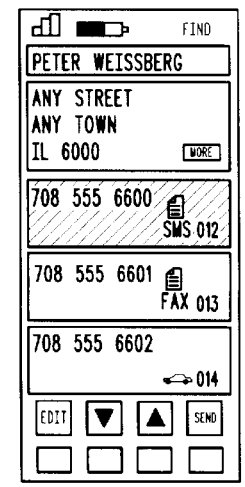

If a user does not know the memory location number associated with an entry, the user has an option of selecting an entry by name at a step 506. The user selects the phone book icon of the main display (FIG. 5-5) and is preferably prompted with a request for a name (FIG. 5-6). The user then selects some or all of the letters of the name at a step 508 (FIG. 5-7) to display those entries having the selected letters (FIG. 5-8). If more than one entry is found at a step 510, all relevant entries are displayed at a step a step 512. The user may cursor through the list of entries at a step 514 and select a particular entry at a step 516. When cursoring through the list of entries, the directory or address number associated with the entry which is highlighted is displayed. When a particular entry is selected, all information associated with the entry, including numbers and associated icons is displayed (FIG. 5-9). The user may then select a stored directory number and associated icon. If a telephone icon is associated with a directory number, the radio communication device will automatically place a call to that number. If another icon is selected, the functional screen associated with that icon will be displayed to enable the user to access the service associated with that icon. For example, if a fax icon is selected, a functional screen associated with transmitting a fax will be displayed.

If the user is not familiar with the name but knows a portion or all of a directory number associated with an entry, the user has the option of selecting an entry by accessing a number stored in the entry at a step 512. The user can select a number (NUM) option (FIG. 5-10) and enter a portion or all of the telephone number (FIG. 5-11) at a step 514. For example, if a user is aware that a party is at a certain area code and exchange, for example, area code 708 and local exchange 523, all numbers associated with that area code and exchange will be displayed along with names and associated icons (FIG. 5-12). If more than one entry is listed at step 510, the user can cursor through the list at step 514 and select a particular entry at step 516 (FIG. 5-13). Accordingly, the user is given another option for locating stored information.

Finally, a user has the option of selecting a particular entry having a stored number associated with an icon at a step 520. In particular, after entering the phone book directory (FIG. 5-14) the 10 user selects the ICON option (FIG. 5-15) and selects a particular icon at a step at a step 522 (FIG. 5-16). Entries having numbers associated with the particular icon are then displayed at a step 524. A particular entry in the list having a predetermined icon can then be found by cursoring through the list or by a name search or number search as described above (FIG. 5-17).

Figure 7:
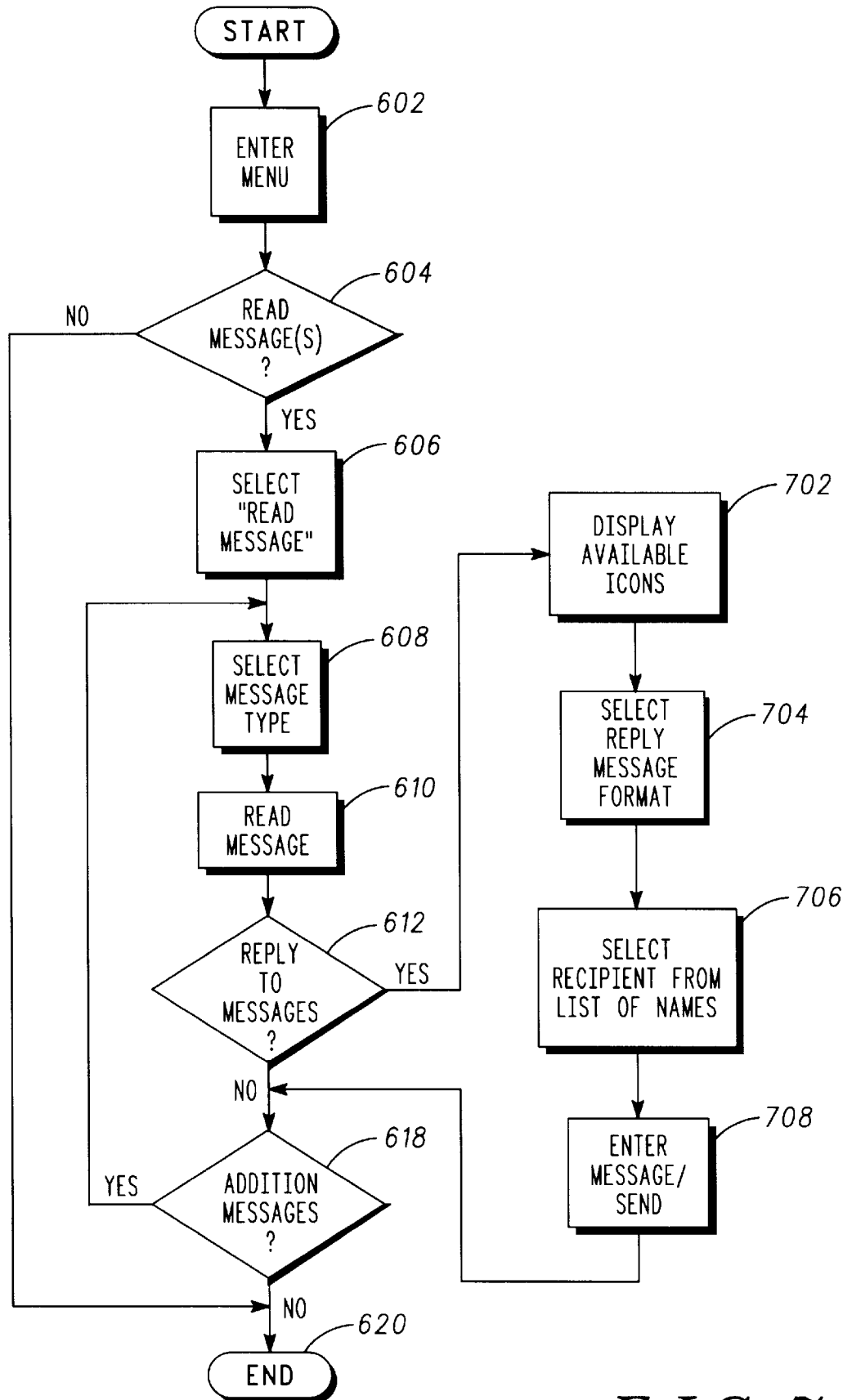
FIG. 7 is a flow chart showing the steps for reading/replying to messages according to an alternate embodiment of the present invention.
Figure 7A:
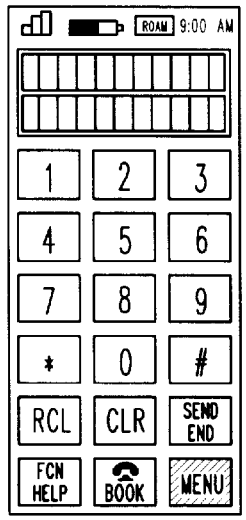
Figure 7B:
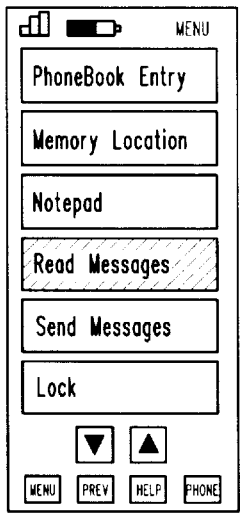
Figure 7C:
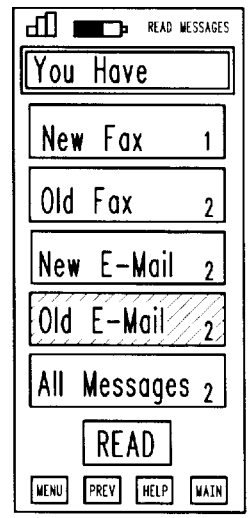
Figure 7D:
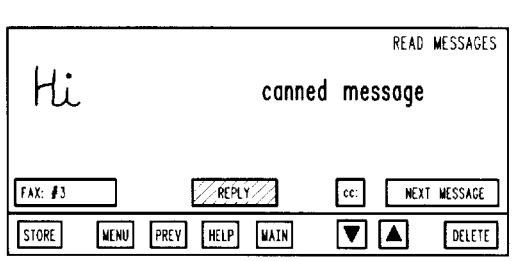
Figure 7E:
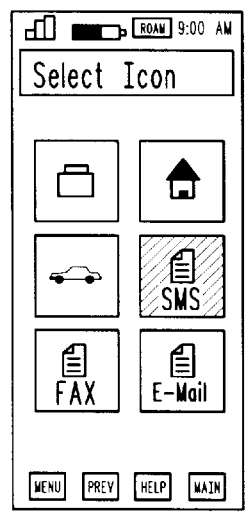
Figure 7F:
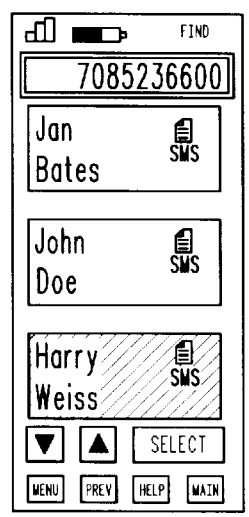

Turning now to FIG. 6, the steps for reading/replying to messages according to the present invention are shown. In particular, when a user enters the MENU (FIG. 6-1) at a step 602, the user has the option to read messages at a step at a step 604. If the user desires to read messages and selects and selects a "Read Messages" option (FIG. 6-2) at a step 606, the user may select a particular message type (FIG. 6-3), for example, phone, email, or fax, at a step 608. After reading the message at a step 610, the user has the option of sending a reply to the message (FIG. 6-4) at a step 612. If the user wants to reply, information associated with the sender which may be stored in the radio communication device will appear on the display. The information which is related to the sender is then displayed on the screen. The user selects a reply message format (FIG. 6-5) at a step 616 from the available methods associated with the sender. The user may then enter or communicate the message at a step 618. The user then has the option of reading additional messages at a step 620. Alternatively, a user may be prompted with a request for a name (FIG. 6-6), in response to which the user may enter a portion or all letters of a name (FIG. 6-7). The relevant entries can be reviewed (FIG. 6-8) with any particular entry being selected(FIG>6-9).

Turning now to FIG. 7, the steps for reading/replying to messages according to an alternate embodiment of the present invention are shown. The steps according to the embodiment of FIG. 7 are identical to the steps of FIG. 6 until the user decides to reply to the message. After deciding to reply to a message, a user prompt will appear with predetermined icons for sending a message (FIG. 7-5) at a step 702. The user then selects a message type or icon at a step 704. The user then accesses a directory of potential recipients for the message, each potential recipient having a directory number and an associated icon stored in the entry (FIG. 7-6). If the selected icon is e-mail for example, the user is provided with a list of recipients who have e-mail icons associated with numbers. The user can then selects a recipient from the names/numbers associated with the selected icon at a step 706. These user can then send the message at a step 708 and read additional messages.

Figure 8:
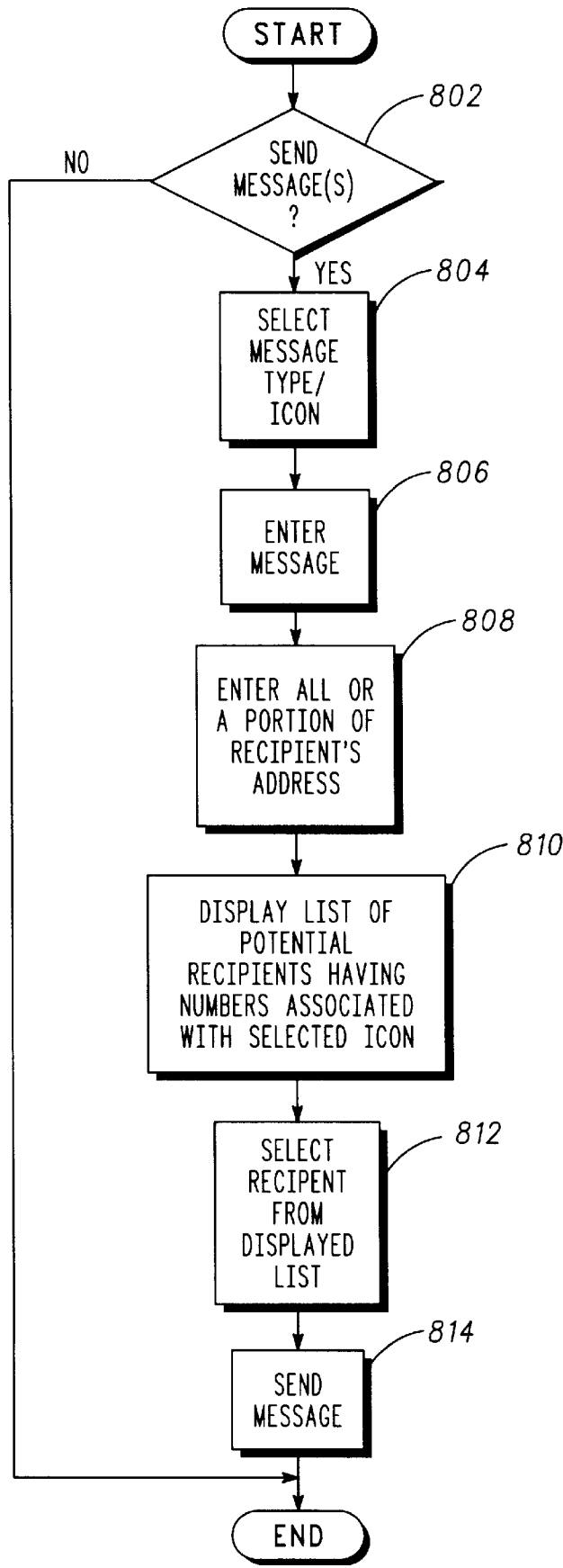
FIG. 8 is a flow chart showing the steps for sending messages according to an alternate embodiment of the present invention.
Figure 8F:
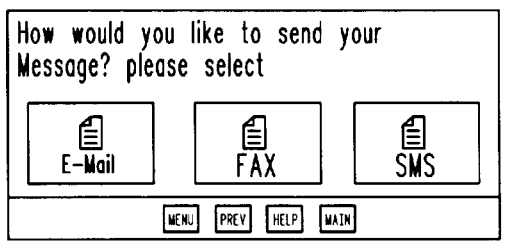
Figure 8F:
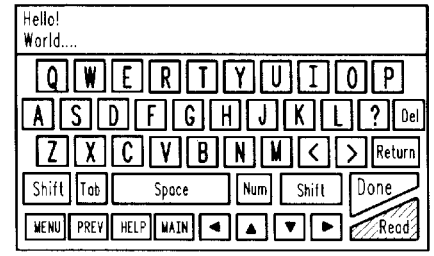
Figure 8F:
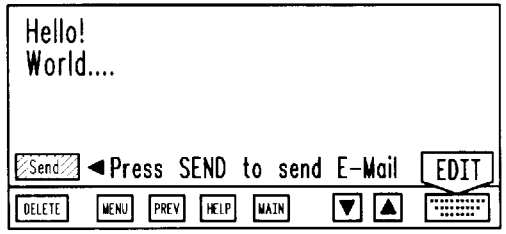
Figure 8F:
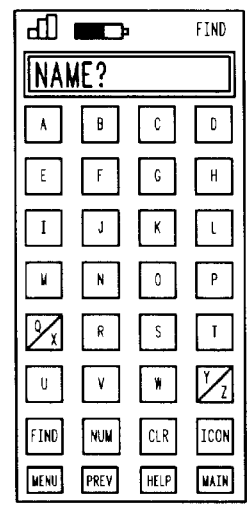
Figure 8F:
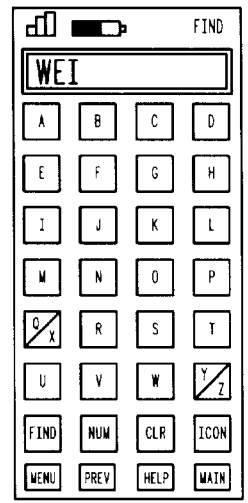
Figure 8F:
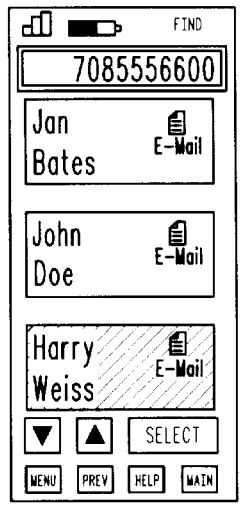

Turning now to FIG. 8, the preferred steps for sending messages according to the present invention are shown. After entering the main menu and deciding to send a message at a step 802, the user selects a message type icon (FIG. 8-1) at a step 804. The user then enters a message (FIG. 8-2) at a step 806. After completing the message and pressing SEND (FIG. 8-3), the user is preferably prompted with a request for a name (FIG. 8-4) The user then enters a portion or all of the recipient's name (FIG. 8-5) at a step 808. A list of potential recipients having numbers associated with the selected icon, such as an e-mail, is then displayed (FIG. 8-6) at a step 810. The user then selects a recipient from the displayed list at a step 812 and automatically sends the message by pressing SELECT at a step 814. Although the selection of the recipient or list of potential recipients is shown by entry of a portion of the name, the recipient could also be selected by entering a portion of a number or selecting an icon to display all entries associated with the selected icon.

Figure 9:
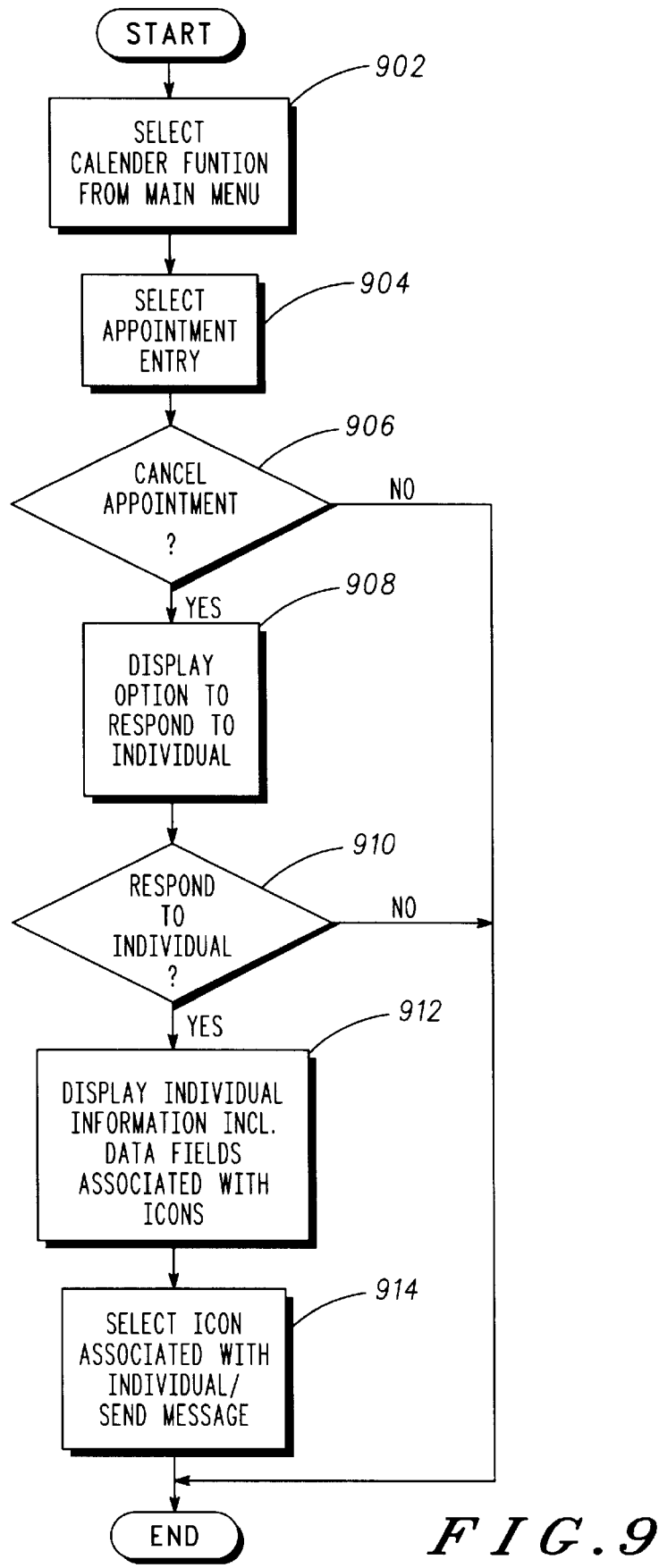
FIG. 9 is a flow chart showing the steps for sending messages when in a calendar mode according to the present invention.

Turning now to FIG. 9, the steps of sending a message in connection with an entry in a calendar function are shown. After selecting a calendar function from the main menu at a step 902, the user selects a particular appointment entry at a step 904. If the user desires to cancel the appointment at a step 906, an option to respond to the individual with whom the appointment was made is displayed at a step 908. If the user desires to respond to the individual, the individual's information including data fields having directory numbers and associated icons is displayed at a step 912. The user then selects a particular icon associated with the individual and sends a message at a step 914.

Figure 10:
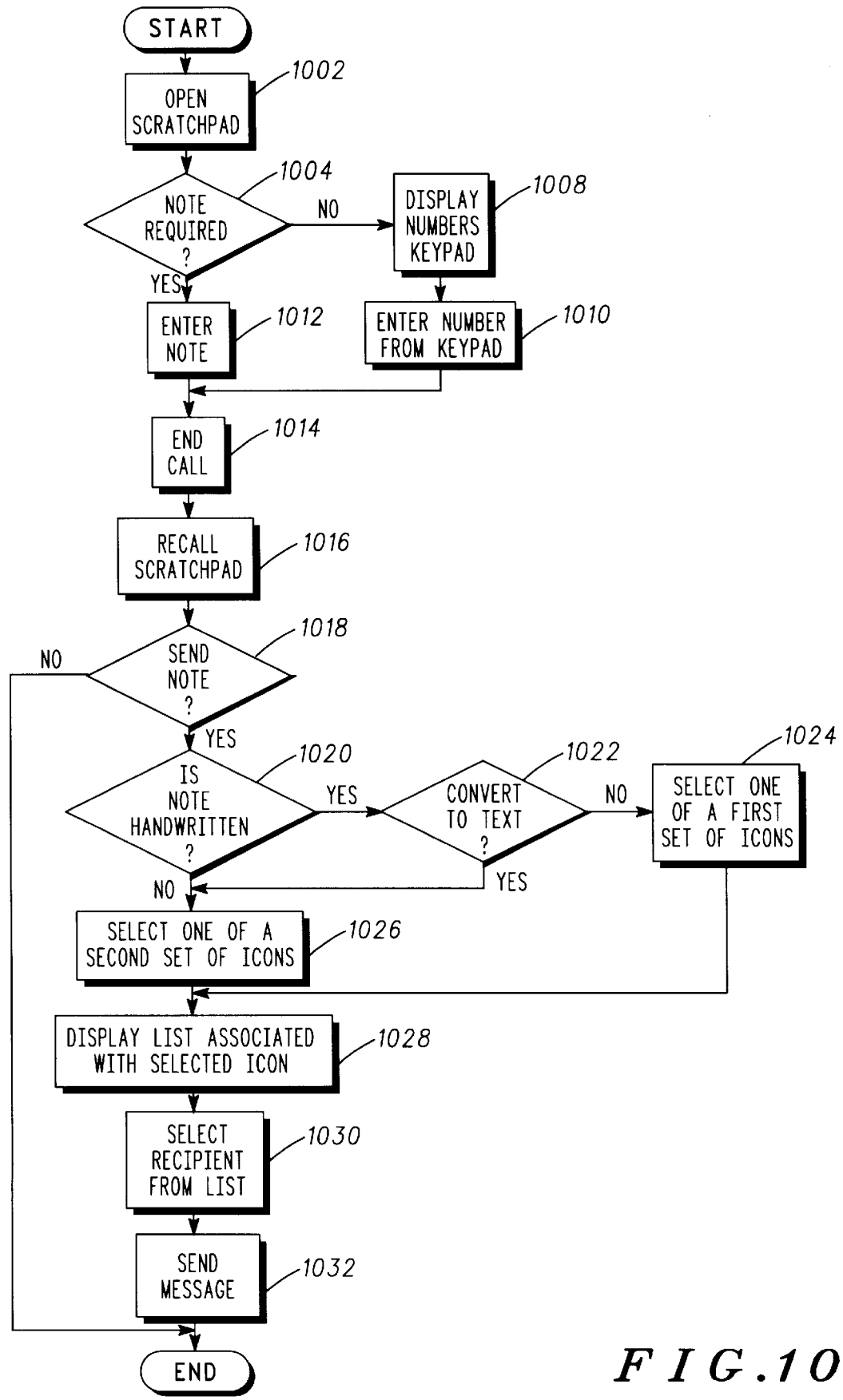
FIG. 10 is a flow chart showing the steps for sending messages when in a scratch pad mode according to the present invention.
Figure 10A:
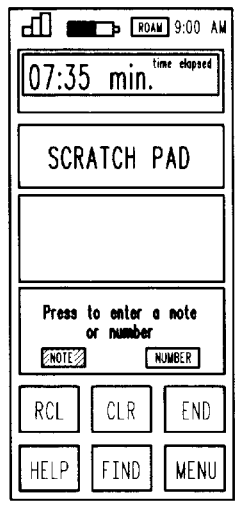
Figure 10B:
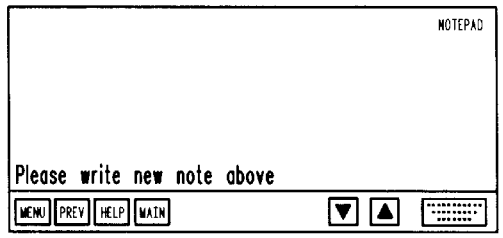
Figure 10C:
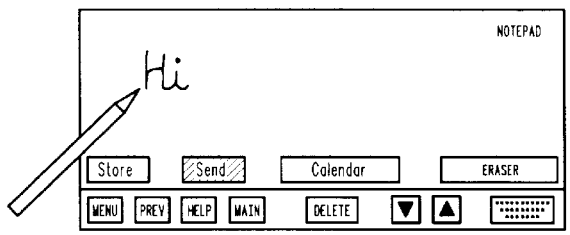
Figure 10D:
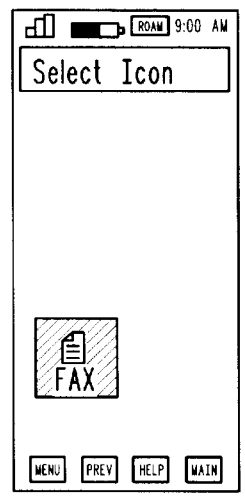
Figure 10E:
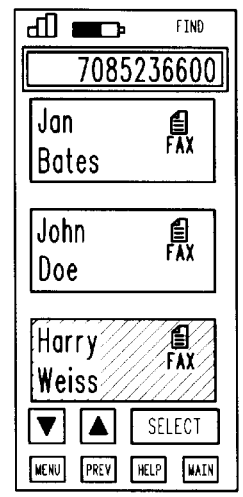
Figure 10F:
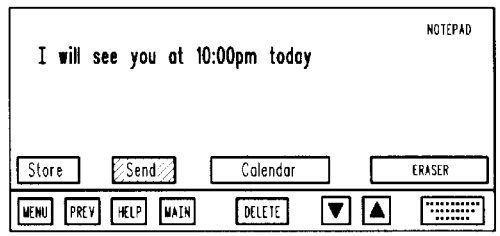
Figure 10G:
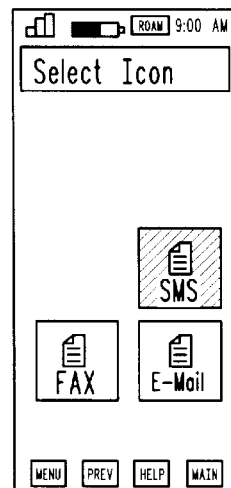
Figure 10H:
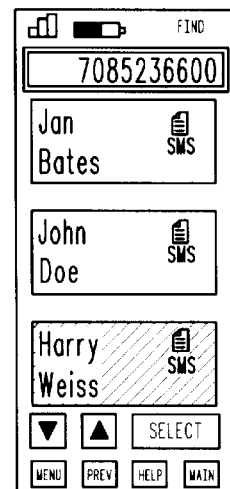

Turning now to FIG. 10, steps for transmitting messages associated with a note pad or scratch pad based upon the use of icons according to the present invention are shown. In particular, when in a call, a user selects the scratch pad function (FIG. 10-1) from the menu at a step 1002. When entering information on the scratch pad, the user has the option of entering a note (FIG. 10-2) or numerical information at a step 1004. If only numeric information is required, a numeric keypad is displayed at a step 1008 and the user can enter the number from the keypad at a step 1010. Otherwise, the user enters a note (FIG. 10-3) at a step 1012.

After ending the call at a step 1014, the user then recalls the scratch pad at a step 1016. Alternatively, a note could be entered in a notepad feature of the radio communication device independent of a call at a step 1016. If the user desires to send the note associated with the scratch pad or notepad at a step 1018, it is then determined whether the note is handwritten at a step 1020. The user is then given the option to convert the handwritten message to text using handwritting recognition software at a step 1022. If the user does not convert the handwriting, the user must then select one icon from a first set of icons (FIG. 10-4) for transmitting the message at a step 1024. For example, a handwritten note in scratch pad could be sent by facsimile, but may not be sent by e-mail or short messaging service. Accordingly, the e-mail or SMS icons would not be displayed. A list of names having numbers associated with the selected icon, in this case a fax machine, is then displayed (FIG. 10-5).

However, if the scratch pad is not in handwriting or is converted to text, the user may select one of a second set of icons for sending the message at a step 1026. In particular, if the message is text (FIG. 10-6) and stored for example as ASCII characters, the message may be sent by facsimile, e-mail, short messaging services or some other method and this second set of icons would be displayed (FIG. 10-7). A list of names having numbers associated with the selected icon are then displayed (FIG. 10-8) at a step 1028. The user then selects a recipient of the message at a step 1030 and sends the message at a step 1032.

Figure 11:
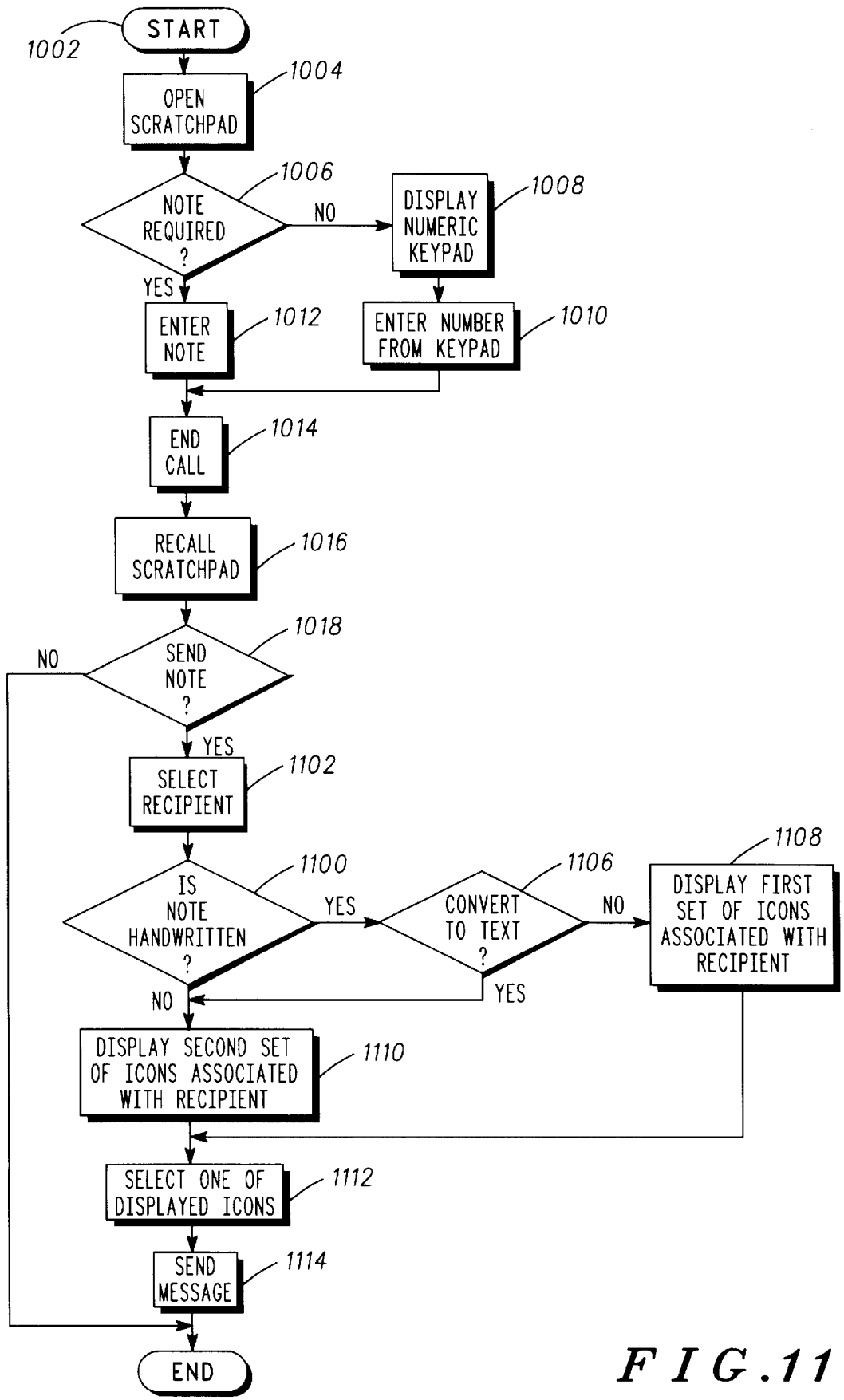
FIG. 11 is a flow chart showing the steps for sending messages when in a scratch pad mode according to an alternate embodiment of the present invention.

Turning now to FIG. 11, an alternate embodiment for transmitting messages from a scratch pad is shown. After deciding to send the note at a step 1018, the user selects a recipient at a step 1102. The recipient can be selected by any means as set forth for example in FIG. 5. If the note on a scratch pad is determined to be in handwriting at a step 1104, the user has the option of converting the handwriting to text at a step 1106. If the handwriting is not converted, a first set of icons associated with the recipient for transmitting handwriting is displayed at a step 1108. However, if the scratch pad is not in handwriting or is converted to text, a second set of icons associated with the recipient is displayed at a step 1110. The user selects one of a displayed set of icons for transmitting the message associated with the recipient at a step 1112 and sends the message at a step 1114.

In summary, a unique method for implementing icons in a radio communication device (103) which provides a plurality of radio communication services such as radiotelephone, facsimile and electronic mail services enables a more efficient user interface. The radio communication device preferably comprises a touch screen display (119) for displaying functional icons stored with directory numbers to simplify the location of information and the transmission of messages. In particular, functional icons associated with one of the plurality of communications services can enable easier searching of directories or transmission of messages when stored in connection with directory numbers.

Although the invention has been described and illustrated in the above description and drawings, it is understood that this description is by way of example only and that numerous changes and modifications can be made by those skilled in the art without departing from the true spirit and scope of the invention. Although the drawings show a radio communication device having a touch screen and movable element, the method of the present invention could be employed in any radio communication device having any type of display. Also, the functional icons could be associated with any available service and should not be limited to the exemplary services described above. Applicants' invention should be limited only by the following claims.

What is claimed is:

1. A method storing telephone numbers in a radio communication device, the radio communication device having a memory and a graphical display, the method comprising the steps of:

entering a telephone number;

choosing a first graphical icon from a predetermined plurality of graphical icons to be associated with said telephone number; and storing said telephone number and said first graphical icon together in the memory.

2. The method of claim 1 wherein each of said plurality of graphical icons represents one of a plurality of radio communication services.

3. A method of operating a radio communication device having a plurality of radio communication services and a memory, the method comprising the steps of:

creating a directory having a plurality of telephone numbers, each of the plurality of telephone numbers having an associated graphical icon associated therewith, the associated graphical icon is chosen from a predetermined plurality of graphical icons representing each of the radio communication services;

selecting one of the plurality of radio communication services; and creating, responsive to the step of selecting, a sub-directory, the sub-directory including a portion of the plurality of telephone numbers having the associated graphical icon representing the selected radio communication service.

4. The method of claim 3 further comprising the steps of:

displaying at least a portion of the sub-directory;

choosing a desired telephone number from the portion of the sub-directory displayed; and activating the radio communication service using the desired telephone number.

5. A method of operating a radio communication device, the radio communication device including a memory and a display, the method comprising the steps of:

entering an alpha tag;

entering at least a first telephone number associated with said alpha tag;

choosing for the at least first telephone number a graphical icon from a predetermined plurality of graphical icons to be associated with said telephone number and further define said telephone number; and storing said alpha tag, said at least first telephone number and said associated graphical icons together in the memory, thereby forming a directory;

displaying at least a portion of the directory;

choosing a desired alpha tag from the directory;

displaying said at least first telephone number and associated graphical icons associated with said desired alpha tag;

choosing a desired graphical icon from the associated graphical icons, thereby choosing a desired telephone number; and activating the desired telephone number.

6. The method according to claim 5 wherein each of a first portion of the predetermined plurality of graphical icons represents a particular radio communication service.

7. The method according to claim 6 wherein the particular radio communication services includes facsimile services, paging services, e-mail services, video services and short messaging services.

8. The method according to claim 5 wherein each of a second portion of the predetermined plurality of graphical icons represents a category of telephone numbers.

9. The method according to claim 8 wherein a category of telephone numbers includes office telephone numbers, home telephone numbers and mobile telephone numbers.

* * * * *

UNITED STATES PATENT AND TRADEMARK OFFICE
CERTIFICATE OF CORRECTION

PATENT NO. : 5,848,356
DATED : March 29, 1999
INVENTOR(S) : Jambhekar, et al.

It is certified that error appears in the above-identified patent and that said Letters Patent is hereby corrected as shown below:

<u>Claim 7</u>

In column 10, line 36, please replace "e-mail services, video" with --e-mail services, data services, video--.

Signed and Sealed this

Twenty-ninth Day of June, 1999

Attest:

Q. TODD DICKINSON

*Attesting Officer*     Acting Commissioner of Patents and Trademarks